(12) United States Patent
Shay et al.

(10) Patent No.: US 7,779,865 B2
(45) Date of Patent: Aug. 24, 2010

(54) PLUMBING VALVE WITH UNDULATING DISK SURFACE

(75) Inventors: Christopher M. Shay, Fredonia, WI (US); Chad J. Cochart, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 543 days.

(21) Appl. No.: 11/788,659

(22) Filed: Apr. 20, 2007

(65) Prior Publication Data

US 2008/0258093 A1  Oct. 23, 2008

(51) Int. Cl.
*F16K 11/06* (2006.01)
*G05D 11/16* (2006.01)

(52) U.S. Cl. .......................... 137/625.41; 137/625.17; 137/454.6

(58) Field of Classification Search .................. 137/237, 137/246, 625.4, 625.41, 625.17, 454.6, 454.5; 251/208, 304, 314
See application file for complete search history.

(56) References Cited

U.S. PATENT DOCUMENTS

| 4,368,756 A | * | 1/1983 | Carlson ....................... 137/541 |
| 4,516,784 A | * | 5/1985 | Merz ........................... 277/639 |
| 4,651,770 A | | 3/1987 | Denham et al. |
| 5,232,022 A | * | 8/1993 | Gougouyan ............... 137/625.4 |
| 5,398,717 A | | 3/1995 | Goncze |
| 5,402,827 A | * | 4/1995 | Gonzalez ................ 137/625.17 |
| 5,655,566 A | | 8/1997 | Tres Casas |
| 5,823,510 A | | 10/1998 | Muramatsu et al. |
| 5,826,615 A | * | 10/1998 | Ko ........................... 137/454.6 |
| 2003/0160199 A1 | * | 8/2003 | Bareis et al. ........... 251/129.11 |

FOREIGN PATENT DOCUMENTS

| EP | 0049327 A1 | 4/1982 |
| EP | 1024332 A2 | 1/2000 |
| FR | 2236102 A1 | 1/1975 |
| JP | 05-001778 | 1/1993 |
| JP | 07-224951 | 8/1995 |
| JP | 09-042479 | 2/1997 |
| JP | 09-042483 | 2/1997 |
| JP | 2000-088117 | 3/2000 |
| JP | 2001-124220 | 5/2001 |
| JP | 2002-250454 | 9/2002 |
| JP | 2003-328405 | 11/2003 |
| JP | 2006-009991 | 1/2006 |
| WO | WO9510725 | 4/1995 |
| WO | WO 95/27162 | 10/1995 |

OTHER PUBLICATIONS

PCT/US2008/004305 International Search Report and Written Opinion; 10 pages.

* cited by examiner

*Primary Examiner*—Kevin L Lee
(74) *Attorney, Agent, or Firm*—Quarles & Brady LLP

(57) ABSTRACT

A control disk for a fluid valve has a disk body having at least one through hole, the body having an upper surface for contacting another control element of the valve and an opposed lower surface. The upper surface is formed with a raised undulating contact surface. The raised undulating contact surface defines pockets suitable for receiving a lubricant.

7 Claims, 10 Drawing Sheets

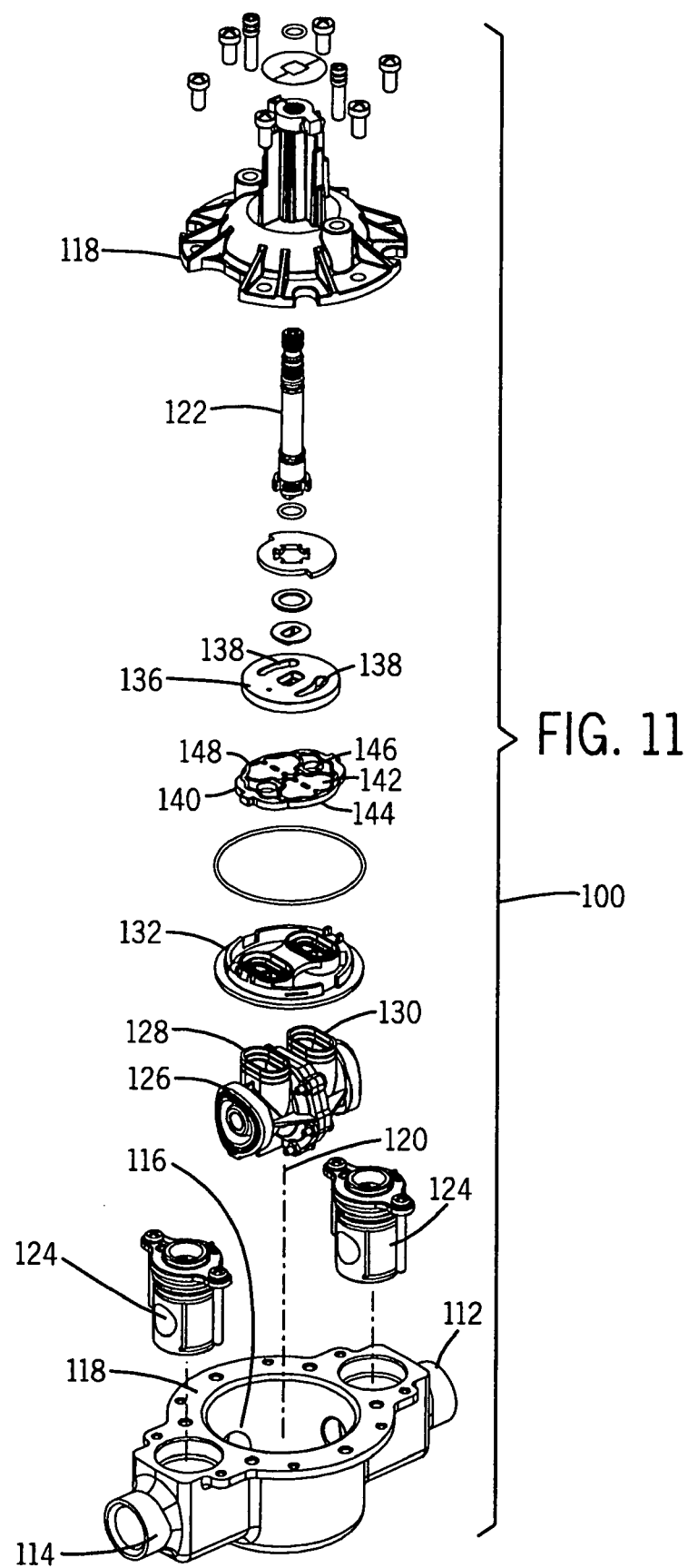

PLUMBING VALVE WITH UNDULATING DISK SURFACE

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

The present invention relates to plumbing valves. More particularly it relates to raised surface structures on control disks which facilitate the operation of such valves.

One form of plumbing valve operates to control flow there through by rotation of a valve control handle. The handle drives a moveable element over a stationary apertured disk. when the aperture aligns with a designated aperture or other path through or by the moveable element, flow is permitted. This type of valve is often referred to as being of the non-rising type, as there is typically no axial movement of the moveable element.

It is desirable in connection with plumbing valves to permit numerous operations, over numerous years, in a reliable fashion. This is made difficult to achieved because of the tendency of some contact parts in non-rise valves to wear, an the tendency of some parts to bind in the presence of grit or other contaminants in the water.

Generally favorable wear and operation characteristics are provided by ceramic disks. Such disks are often used in volume control valves where a single type of water is controlled. They are also used in mixing valves where volume and the mix of hot and cold water are controlled by a single valve. Further, they are found in water distribution valves where one or more inputs are directed between multiple outlets (e.g. a bath spout versus a shower). See e.g. U.S. Pat. Nos. 4,651,770, 5,398,717 and 5,823,510.

However, when the facing surfaces of the stationary and moveable ceramic disks are in complete contact across the disks (except for the apertured area). This results in the need for greater force to rotate the valve. Further, such forces can increase premature wear.

There have therefore been some efforts to reduce the area of the ceramic disks that are in contact with each other. For example, FIG. 1 depicts a prior art stationary ceramic disk 10 which has wheel, hub and spoke-shaped raised contact areas that are quite small relative to the overall top view area of that disk. While such a design reduces the frictional resistance between the two disks, all the contact force is focused along those limited contact areas. Over time this can still lead to premature wear.

Hence, a need exists for further improved disk structures for use with valves of this type.

SUMMARY OF THE INVENTION

In one aspect the present invention provides a control disk for a fluid valve. It has a disk body having at least one through bore, the body having an upper surface for contacting another control element of the valve and an opposed lower surface. The upper surface is formed with a raised undulating contact surface.

In preferred forms the undulating surface extends adjacent a radial periphery of the disk around 360 degrees. The raised undulating surface defines pockets suitable for receiving a lubricant adjacent the undulating surface.

There may be a first raised undulating ring adjacent a central portion of the upper surface and a second raised undulating ring adjacent a radial periphery of the disk. The first and second raised undulating rings may be interconnected by at least one linear spoke.

In other preferred forms the control disk has at least one radial projection extending outward of a generally circular circumference to facilitate alignment in a control valve, the control disk is for use as a stationary control disk undulating surface has a periodic contour. The disk may have one, two, three or more through apertures.

In other aspects of the invention the disk is mounted in a plumbing control valve selected from the group consisting of volume control valves, mixing valves, and water distribution valves, preferably as part of a valve cartridge. The cartridge could have an outer housing, a rotatable spindle, a rotatable disk is within the housing and connected to the rotatable spindle, and a fixed disk in the housing.

Advantages of the present invention in various embodiments include that friction is reduced between the two ceramic disks, while also minimizing the number of debris particles which get trapped between the ceramics causing an undesirable increase in operation torque. In this regard the contracted surface of the rotating member oscillates during rotation.

Another advantage of the present invention is that the undulating raised surface provides an efficacious location for placing lubricant, which also promotes low operating torque.

Yet another advantage of the present invention is that these disks can be used to replace existing stationary ceramic disks without further modification of some valves.

These and still other advantages of the present invention will be apparent from the detailed description which follows and the accompanying drawings. Hence, the following claims should be looked to in judging the full scope of the invention.

BRIEF DESCRIPTION OF THE DRAWINGS

FIG. 11 is an exploded perspective view of the mixing valve of FIG. 10; and

DETAILED DESCRIPTION OF THE PREFERRED EMBODIMENTS

Figure 1:
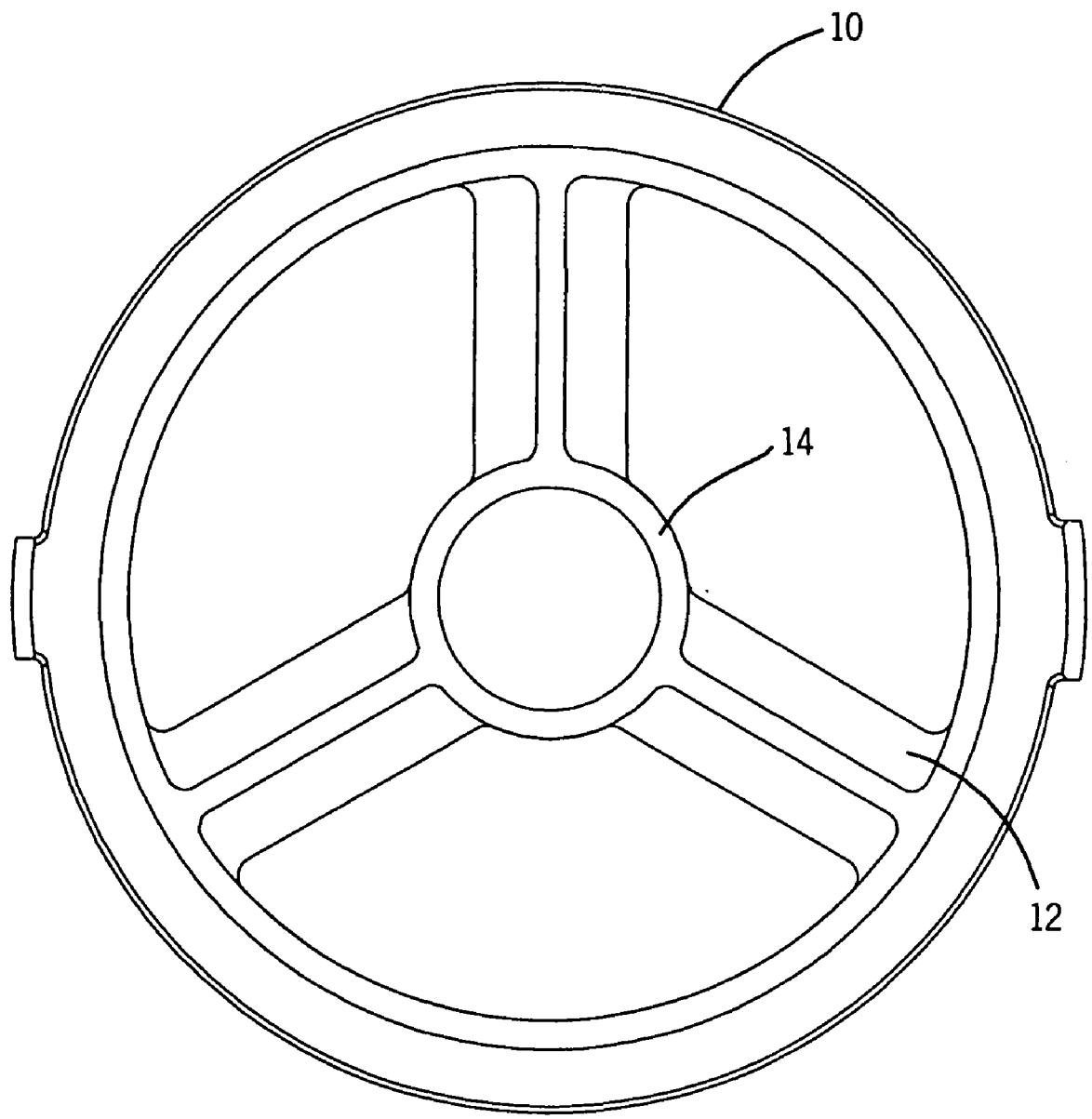
FIG. 1 is a top plan view of a prior art stationary ceramic disk.

FIG. 1 discloses a prior art stationary disk having an outer raised area 10 in the form of a wheel, and raised support spokes 12 leading to a raised hub area 14.

Figure 2:
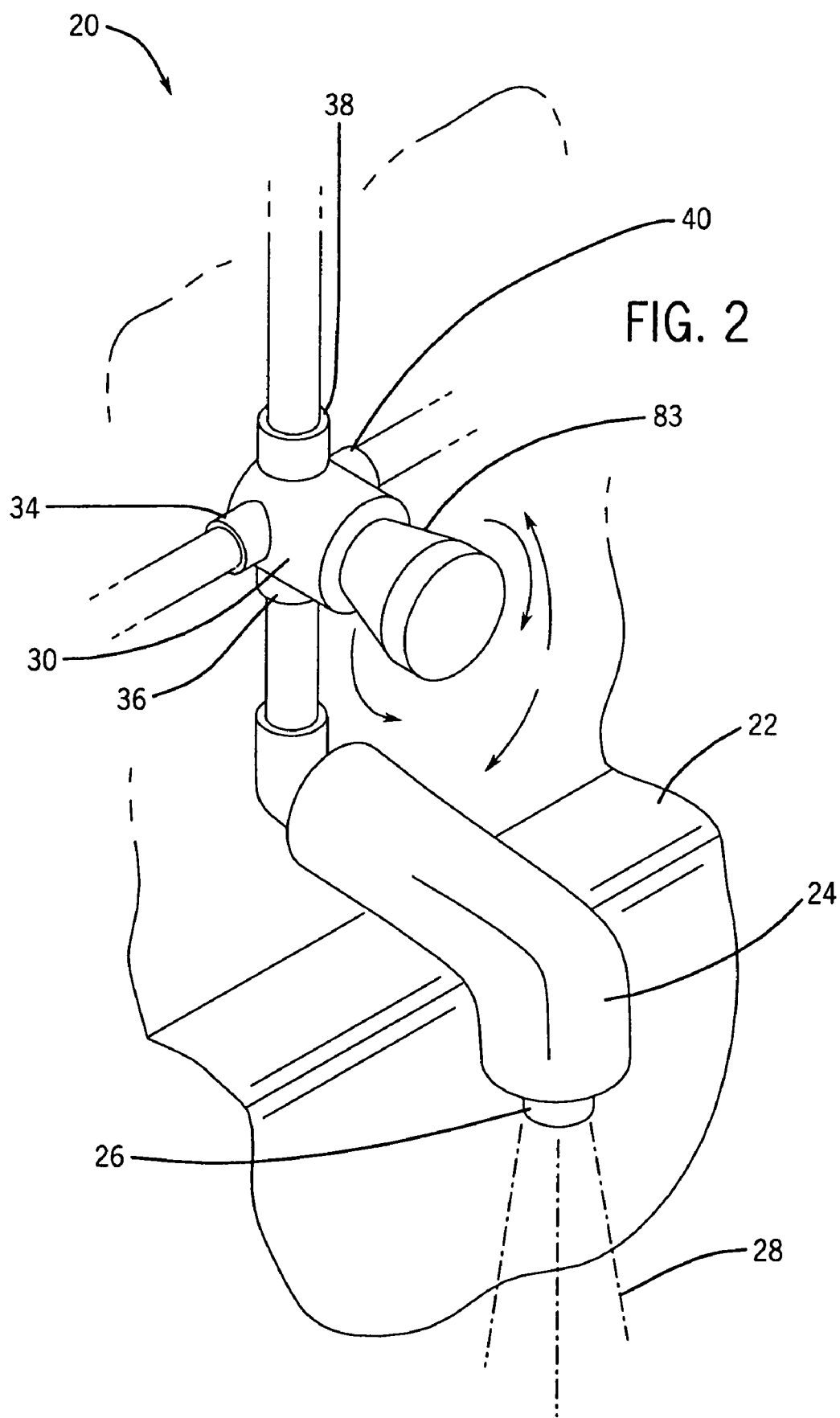
FIG. 2 is a perspective view of a water distributor valve using such a disk installed adjacent a bathroom area.

Turning now to embodiments of the present invention, FIG. 2 shows a water distributor 20 used adjacent a bathtub 22. While the fixture shown is a bathtub, it should be appreciated that the invention can be used with any plumbing fixture (e.g. shower; sink; lavatory). Spout 24 leads to an outlet 26 to deliver water from the distributor 20 to the bathtub 22.

Cartridge valve 30 is positioned in the water distributor. Cartridge valve 30 can divert an inlet fluid supply 34 (hot or cold water, or mixed) to one of three or a combination thereof, outlets 36, 38, 40. We show outlet 36 leading to the bathtub 22, outlet 38 leading to a shower head supply line, and outlet 40 leading to a personal shower supply line.

Figure 3:
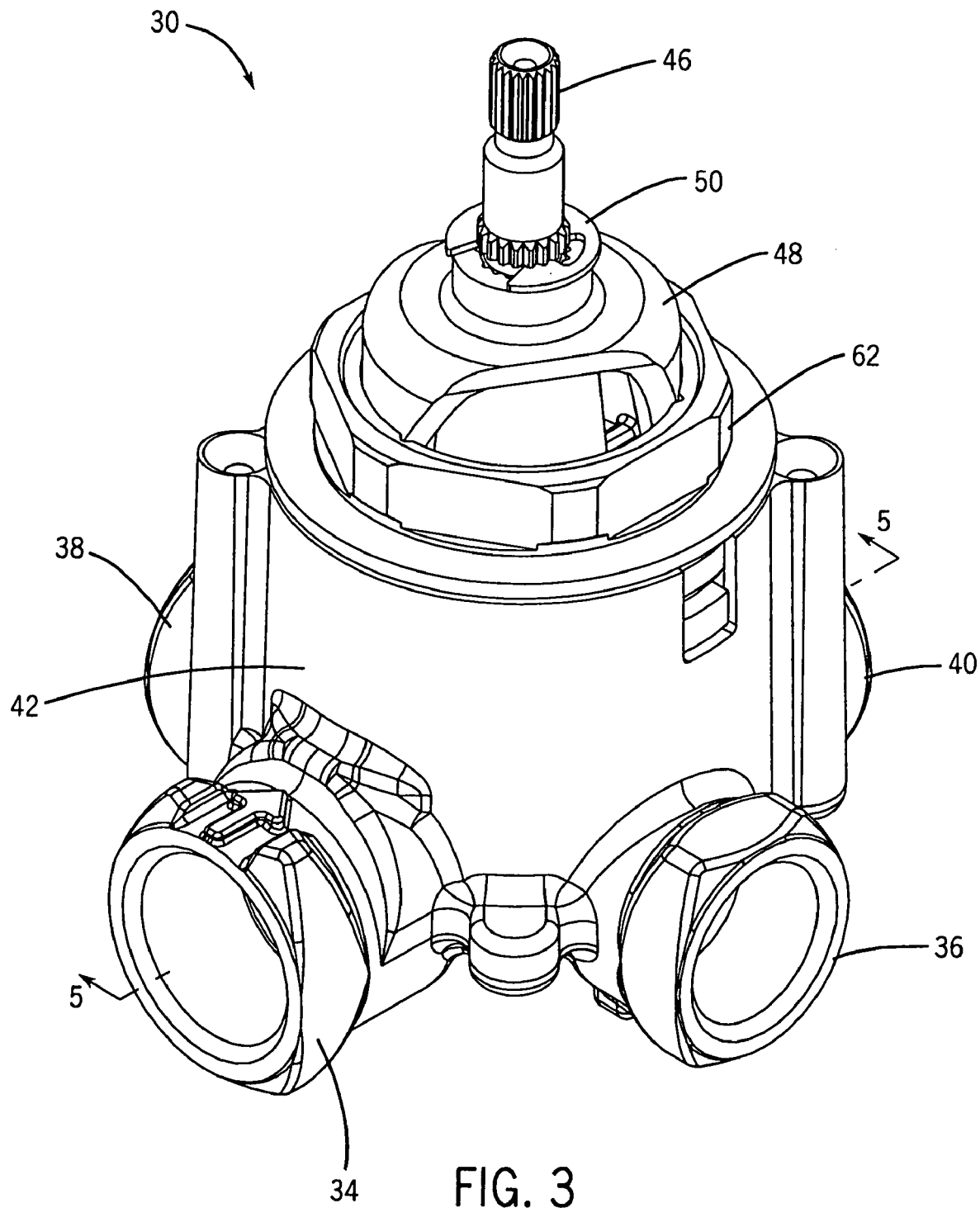
FIG. 3 is a perspective view of the water distributor valve of FIG. 2, albeit rotated from the FIG. 1 position.
Figure 4:
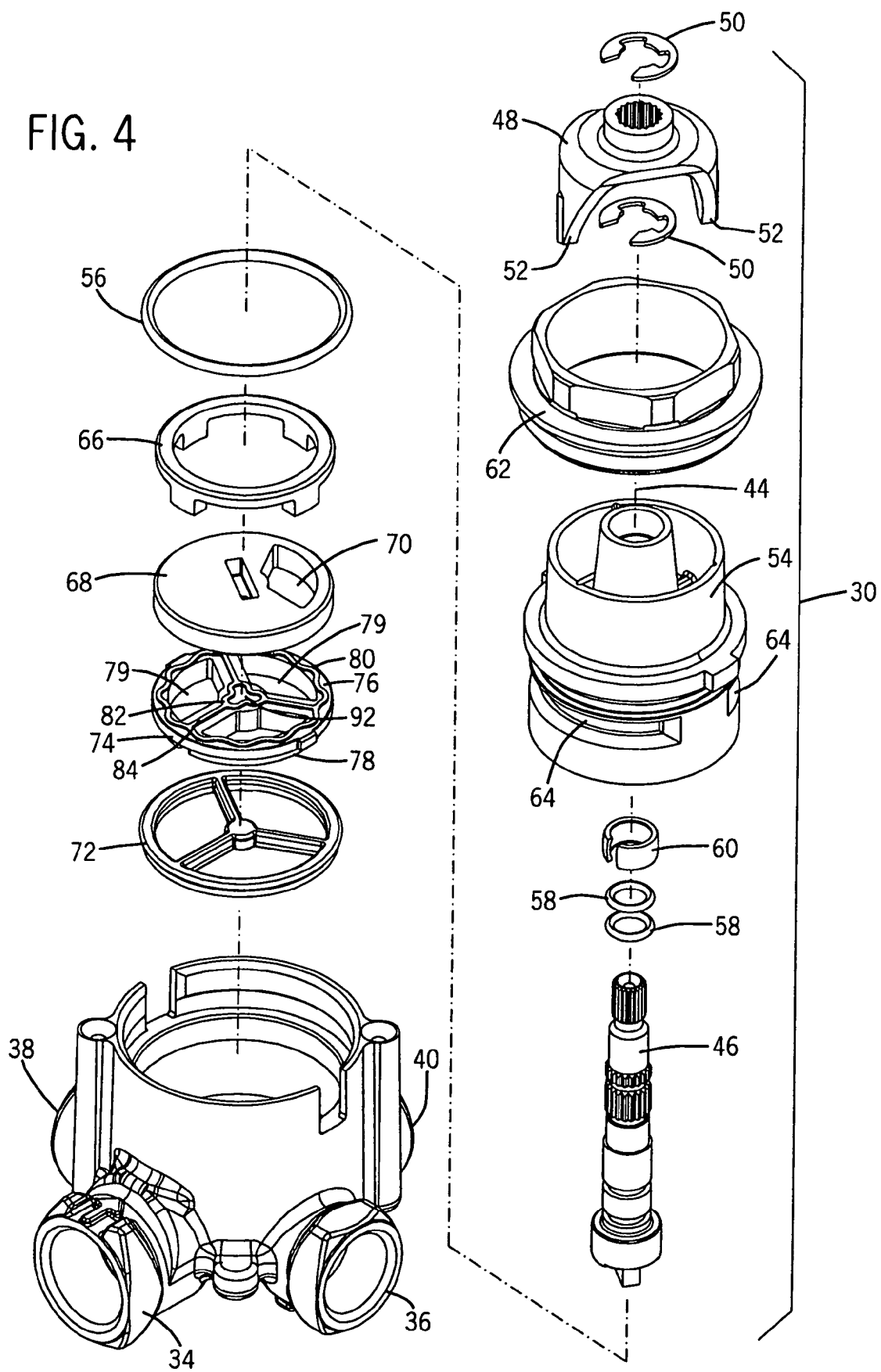
FIG. 4 is an exploded perspective view of the water distributor valve of FIG. 3.
Figure 5:
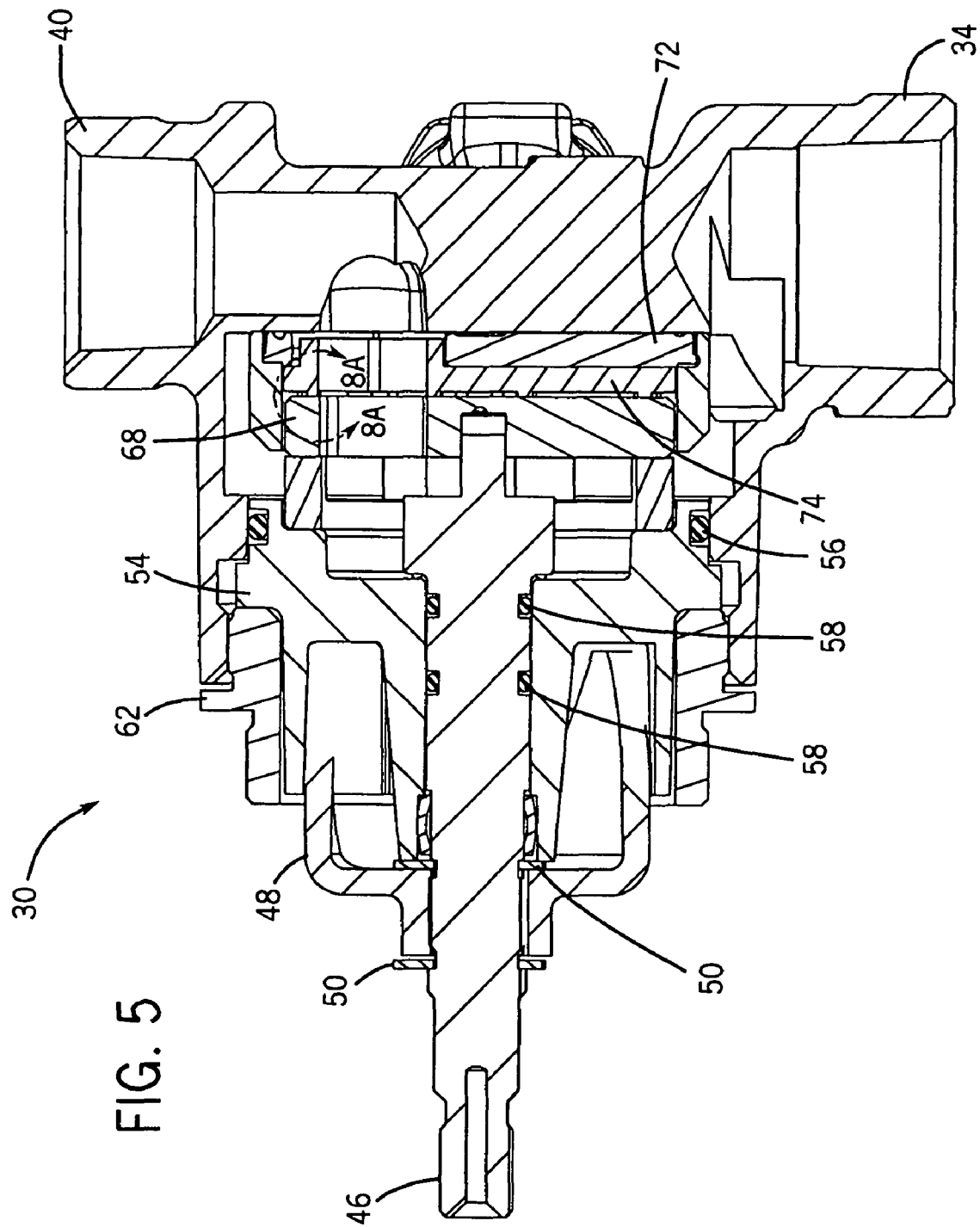
FIG. 5 is a cross-sectional view taken along section line 5-5 of FIG. 3.

Referring next to FIGS. 3-5, cartridge valve 30 includes an outer housing 42 configured for fluid communication with a supply of at least one of hot fluid and cold fluid, particularly at inlet fluid supply 34. A rotatable spindle 46 is connected to housing 42. A handle 83 can be mounted on the spindle 46.

Collar 48 is fixed axially to spindle 46 using split washers 50. Legs 52 positively click into corresponding recesses (not shown) in upper cartridge housing 54 when inlet 34 is routed to one and only one outlets 36, 38, 40. Otherwise legs 52 slide over a surface in upper cartridge housing 54 to continuously select varying combinations of two of the three outlets 36, 38, 40.

O-ring 56 provides a fluidic seal between upper cartridge housing 54 and housing 42. Similarly, O-rings 58 provide a fluidic seal between upper cartridge housing 54 and spindle 46. Further, spacer 60 maintains a correct orientation of spindle 46 axially. Nut 62 threadingly engages housing 42 to seat upper cartridge housing 54, and other elements, within housing 42.

Fluid enters through inlet 34, through apertures 64 in upper cartridge housing 54, between bearing 66 and rotatable disk 68, and through flow aperture 70 extending through rotatable disk 68 in an axial direction, to selectively discharge through one of, or a combination of two, outlets 36, 38, 40 depending on where the aperture 70 is relative to the stationary disk. A toe at the bottom of spindle 46 fits into a corresponding slot in the rotatable disk 68, permitting the spindle to rotate the disk.

Gasket 72 provides fluidic seal between housing 42 and a fixed disk 74 within housing 42. Fixed disk 74 has a first surface 76 oriented toward rotatable disk 68, and a second surface 78 opposite first surface 76. At least one flow aperture 79, and in the embodiment shown three flow apertures 79, fluidically corresponding to outlets 36, 38, 40, extend through first surface 76 and second surface 78, allow the fluid to be conducted from flow aperture 70 in rotatable disk 68 to one, or a combination of two, outlets 36, 38, 40.

Raised surfaces (80, 82, 84) are formed along the first surface 76. Rotatable disk 68 contacts only those raised portions. This minimizes the contact area between fixed disk 74 and rotatable disk 68. Not that many consumers (e.g. those with arthritis) are unable or don't want to use significant force to turn a plumbing valve on and off. This reduces the needed force.

Moreover, as the disks rotate relative to one another the portion of the rotating disk that is contacted oscillates radially inward and outward, and thus anyone given groove along the disk is not continuously contacted. This reduces wear and maintenance concerns.

Figure 6:
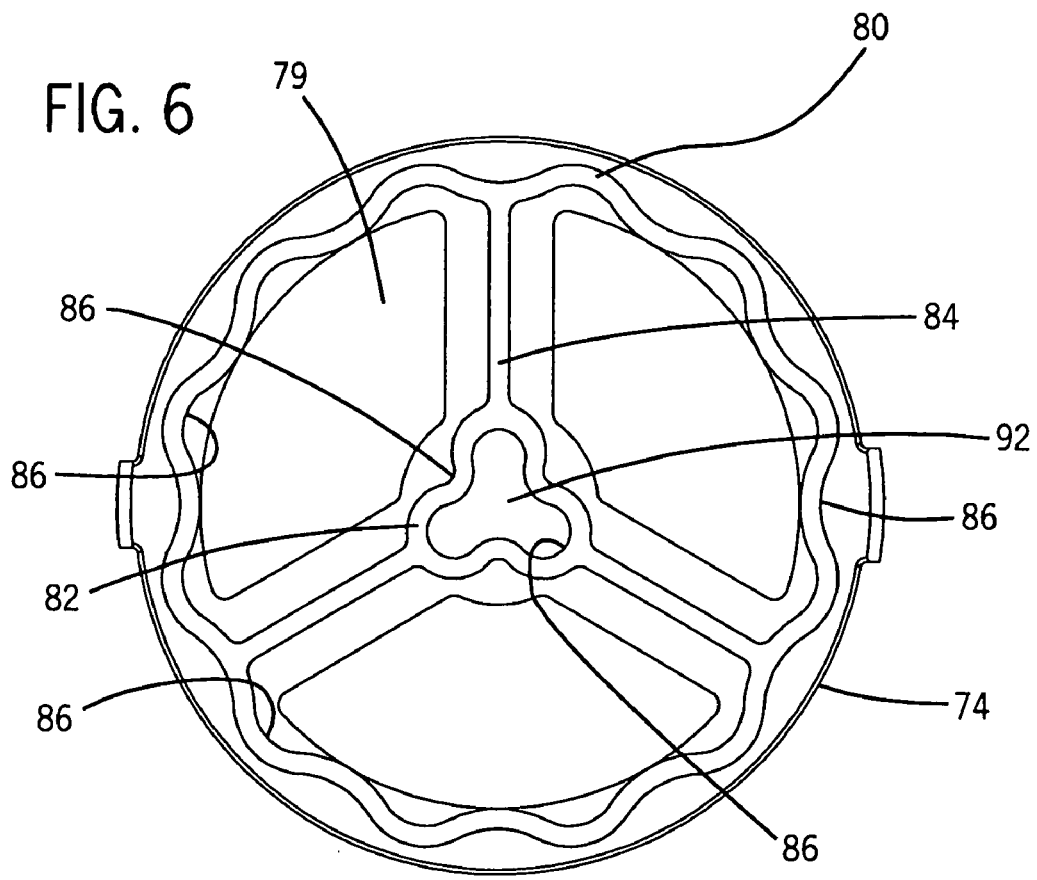
FIG. 6 is a top view similar to FIG. 1, but of a stationary ceramic disk of the present invention.
Figure 7:
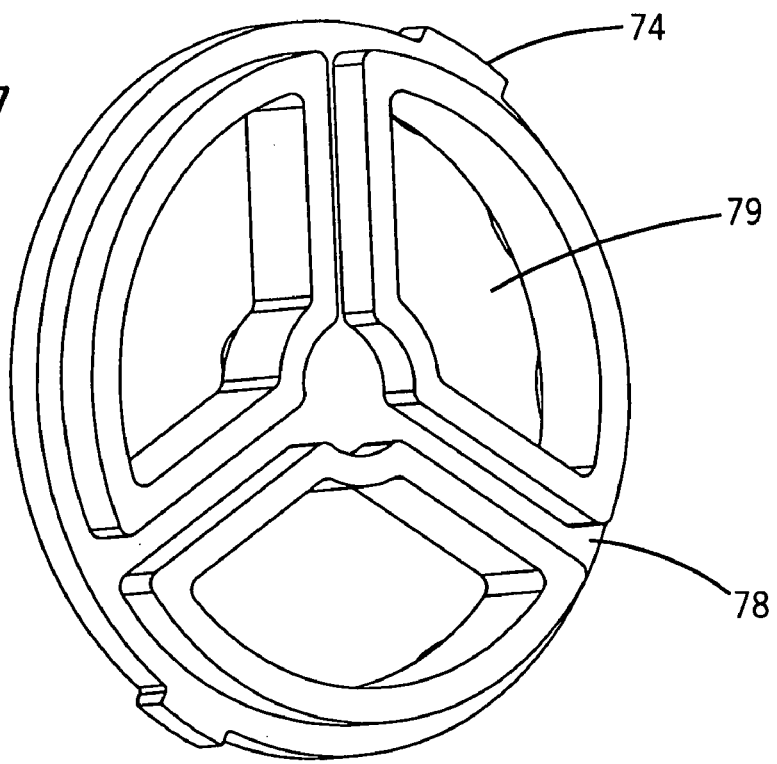
FIG. 7 is a bottom perspective view of the ceramic disk of FIG. 6.
Figure 8A:
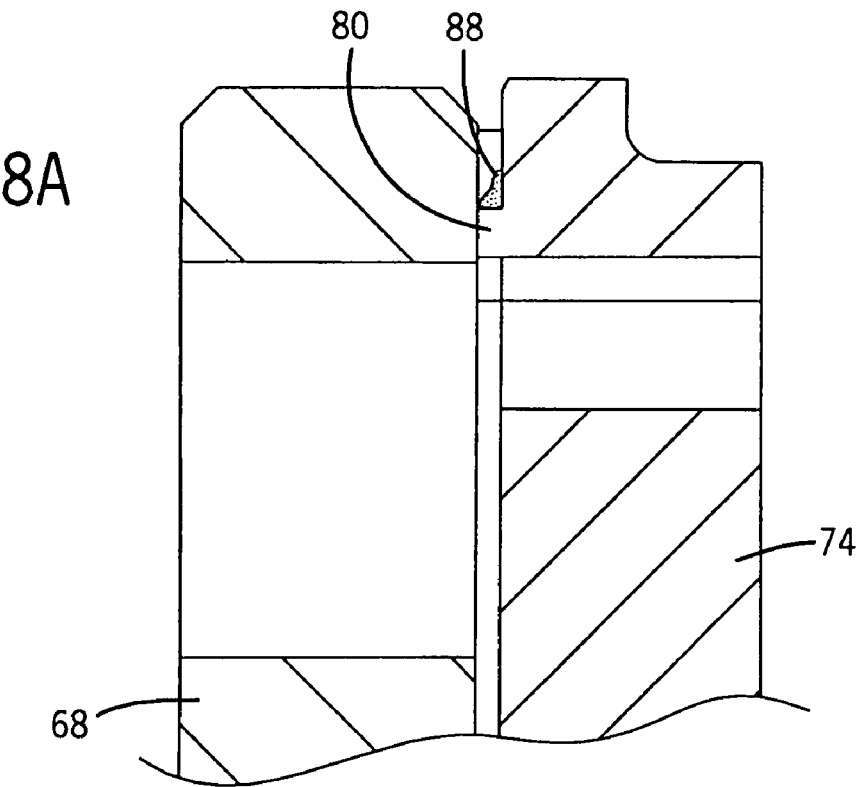
FIG. 8A is a cross-sectional detail of region 8A-8A of FIG. 5.
Figure 8B:
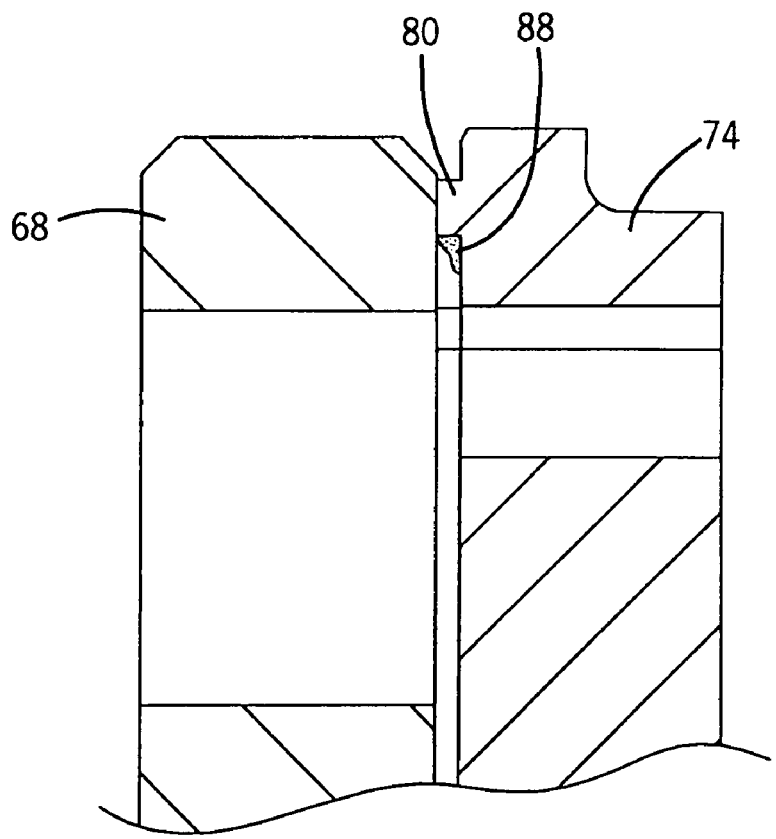
FIG. 8B is a view similar to FIG. 8A, but shown with lubricant differently positioned on a slightly different disk structure.

An additional improvement is best understood from FIG. 6 and FIGS. 8A and 8B. The raised undulating surfaces create pockets 86. A lubricant (e.g. grease) 88 can be positioned in these pockets at the factory, or by a maintenance worker. Then, as the valve is used, this lubrication can slowly bleed to the joint between the disks, further reducing friction and wear.

The raised undulating surfaces can be of varied shapes. For example there can be a first raised undulating surface 80 near the radial periphery of fixed disk 74. This can circumscribe the perimeter of disk 74 for stability. The pattern of undulation can be uniform around the circumference, albeit this is not required.

There can also be second raised undulating hub-like surface 82 located around center 92. A plurality of linear raised spoke surfaces 84 can also be provided. Each of the flow apertures 79 can thus be bounded by undulating portion and a connecting linear portion.

As shown in FIGS. 8A and 8B, the lubricant 88 can be on either e inward facing pockets 86 or outward facing pockets (on the other side of the undulating surface).

Figure 9:
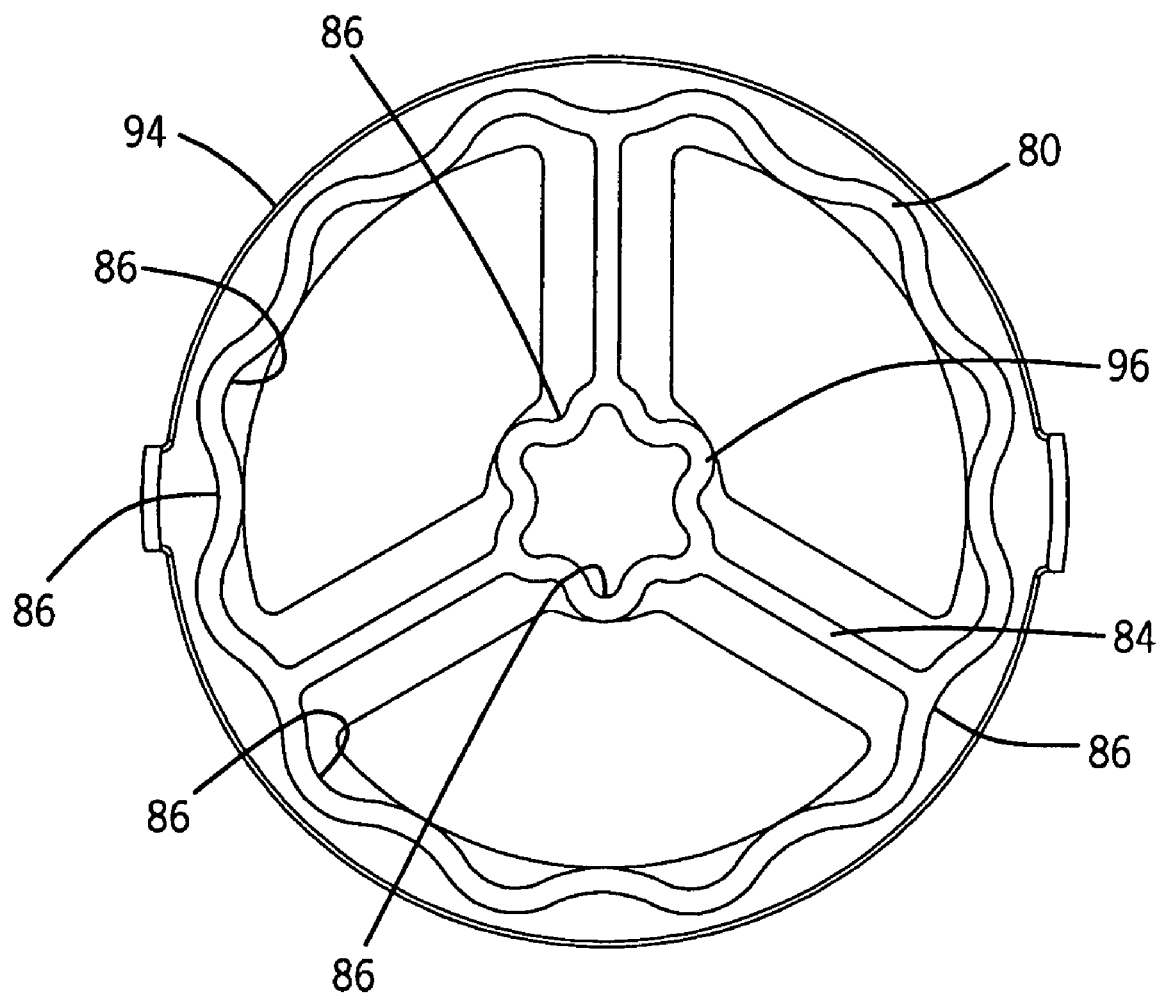
FIG. 9 is a view similar to FIG. 6 but of a second preferred stationary disk.

FIG. 9 embodiment shows a stationary ceramic disk 94 with a modified central undulating surfacing 96.

Figure 10:
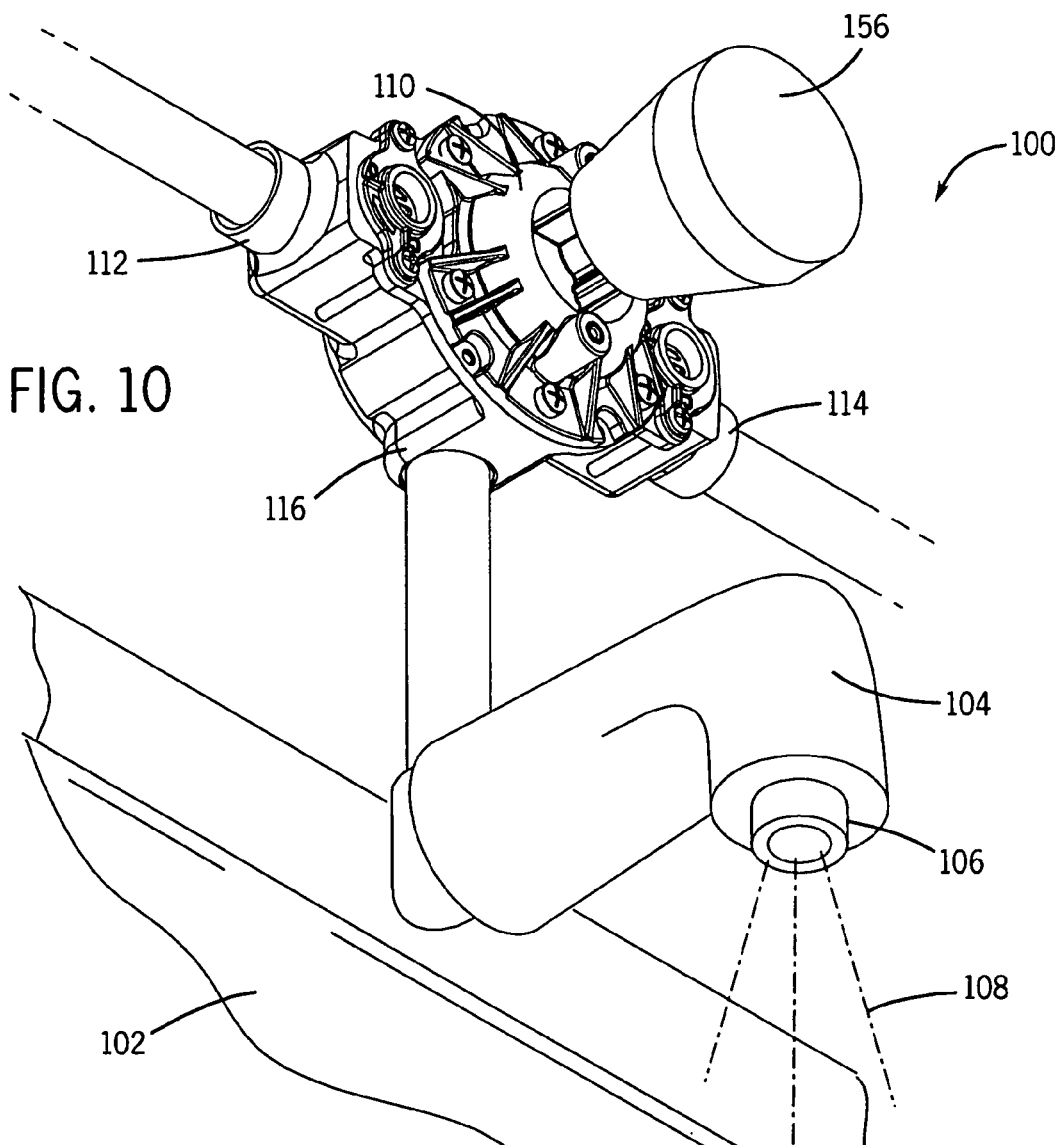
FIG. 10 is a perspective view of a mixing valve using such a disk installed adjacent a bathroom area.
Figure 12:
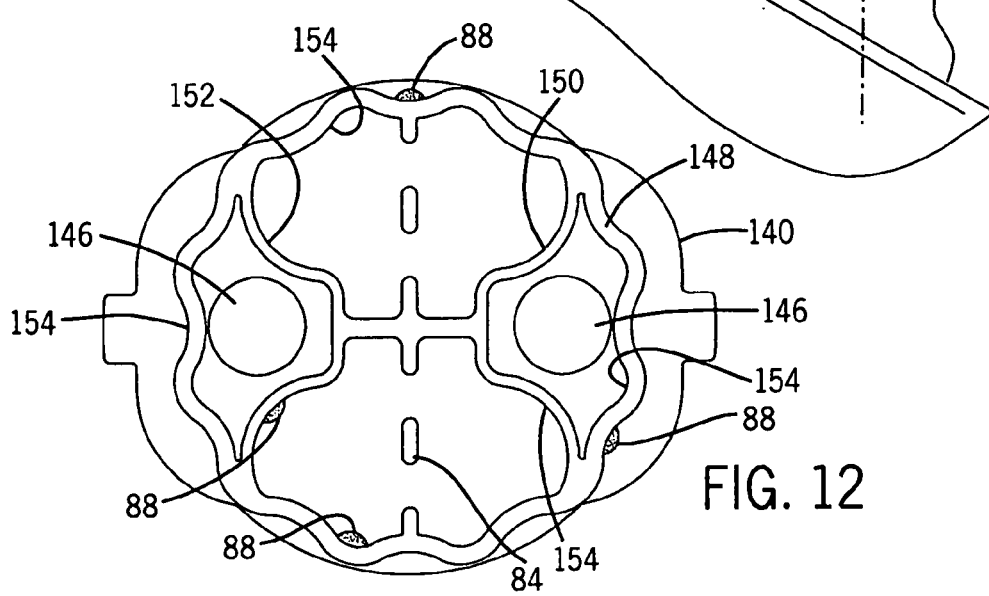
FIG. 12 is a view similar to FIG. 9, showing a preferred stationary disk for use with the FIG. 10 embodiment.

In the embodiments of FIGS. 10-12 the valve 100 is a mixing valve. It feeds a basin 102 via a faucet 104 having a spout 106 configured for a fluid discharge 108. A non-rising cartridge valve 110 is in fluid communication with spout 106. Plumbing fixture 100 can be a bathtub, a vanity, and/or shower.

In the specific embodiment shown in FIGS. 10-12, valve 110 is shown as a mixing valve which can mix a hot fluid inlet 112 and a cold fluid inlet 114 and discharge to outlet 116. Non-rising cartridge valve 110 include a housing 118 configure for fluid communication with a supply of at least one of hot fluid and cold fluid, particularly at inlets 112 and 114, and housing 118 includes an axial direction 120.

A rotatable spindle 122 is connected to housing 118 and extends in axial direction 120. Stop valves 124 are positioned at each inlet which allow for separate shut off/turn of the hot and cold fluids during installation and/or in the event that valve 110 needs to be serviced. The inlet fluids flow into housing 118, through corresponding stop valves 124, and into pressure balance unit 126. Pressure balance unit 126 regulates the pressure of the two fluid inlets, so that in the event of someone flushing a toilet or turning on another water valve within the plumbing system, there will not be a corresponding change in outlet 116 temperature.

The fluid exits pressure balance unit 126 through outlets 128, 130 and flows through gasket 132. A rotatable disk 136 is within housing 118 and is connected to rotatable spindle 122. Rotatable disk 136 includes at least one first flow aperture 138, and in the embodiment shown two flow apertures 138, extending through rotatable disk in axial direction 120.

A fixed disk 140 is within housing 118, and fixed disk 140 has a first surface 142 oriented toward rotatable disk 136, and a second surface 144 opposite first surface 142 in axial direction 120. At least one second flow aperture 146 extends through first surface 142 and second surface 144. Undulating surfaces 148, 150, 152 extend from first surface 142, and rotatable disk contacts the raised undulating surfaces 148, 150, 152. Raised undulating surfaces 148, 150, 152 include at least one concave contour 154, and a lubricating grease 88 can be in contact with at least some of the concave contours 154.

The undulating surfaces 148, 150, 152 include a first raised undulating surface 148 approximately at a perimeter of fixed disk 144 that circumscribe the perimeter. The first raised undulating 148 surface can have a periodic contour, as shown.

After the fluids exit pressure balance unit 126 through outlets 128, 130 and flow through gasket 132, they are present at second flow apertures 146 to be selectively mixed via first flow apertures 138 in rotatable disk 136, as handle 156 rotatably actuates spindle 134 and disk 136. Similarly, the raised undulating surface of the present invention can be incorporated into other valves such as a thermostatic valve, or any other rotational movement ceramic valve.

While this invention has been described as having preferred designs, the present invention can be further modified within the spirit and scope of this disclosure. For example, undulations need not be curved, may only be undulating along contact surface rather than axially, and they can be in zig-zag form.

Also, while the preferred disk is separate from the cartridge base, the term disk is also intended to cover structures where it is integral therewith. Hence, this patent is therefore intended to be broader than just the preferred embodiments.

INDUSTRIAL APPLICABILITY

The present invention provides disks with raised undulating surfaces for use in plumbing valve.

What is claimed is:

1. A plumbing control valve comprising:
   a rotational control disk having a facing surface; and
   a fixed control disk having at least one through hole, a facing surface of the fixed control disk contacting the facing surface of the rotational control disk when the rotational control disk is rotated to control flow through the control valve;
   wherein the facing surface of the fixed control disk is formed with a raised contact surface that undulates in a radial fashion;
   wherein the plumbing control valve is selected from the group consisting of volume control valves, mixing valves, and water distribution valves;
   wherein there is a first raised undulating ring adjacent a central portion of the facing surface of the fixed control disk, there is also a second raised undulating ring adjacent a radial periphery of the fixed control disk and around the first raised ring, and the first and second raised undulating rings are interconnected by at least one raised spoke.

2. A plumbing control valve comprising:
   a rotational control disk having a facing surface; and
   a fixed control disk having at least one through hole, a facing surface of the fixed control disk contacting the facing surface of the rotational control disk when the rotational control disk is rotated to control flow through the control valve;
   wherein the facing surface of the fixed control disk is formed with a raised contact surface that undulates in a radial fashion;
   wherein the plumbing control valve is selected from the group consisting of volume control valves, mixing valves, and water distribution valves;
   wherein the raised undulating contact surface defines outwardly open pockets between the disks that retain grease lubricant adjacent the raised undulating contact surface.

3. The plumbing control valve of claim 2, wherein the raised undulating contact surface extends adjacent a radial periphery of the fixed control disk.

4. The plumbing control valve of claim 3, wherein the raised undulating contact surface extends around 360 degrees of the radial periphery of the fixed control disk.

5. The plumbing control valve of claim 2, wherein the fixed control disk has at least one radial projection extending outward of a generally circular circumference to facilitate alignment.

6. The plumbing control valve of claim 2 having a plurality of through apertures.

7. The plumbing control valve of claim 2, wherein the disks are mounted in a valve cartridge.

\* \* \* \* \*